(No Model.)
A. H. GINDELE.
GAS METER CONNECTION.
No. 506,489. Patented Oct. 10, 1893.
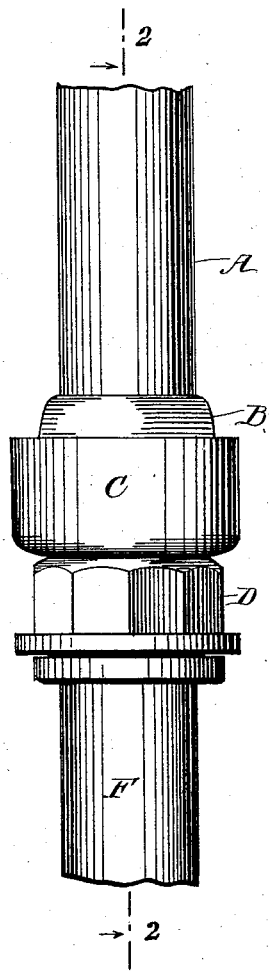
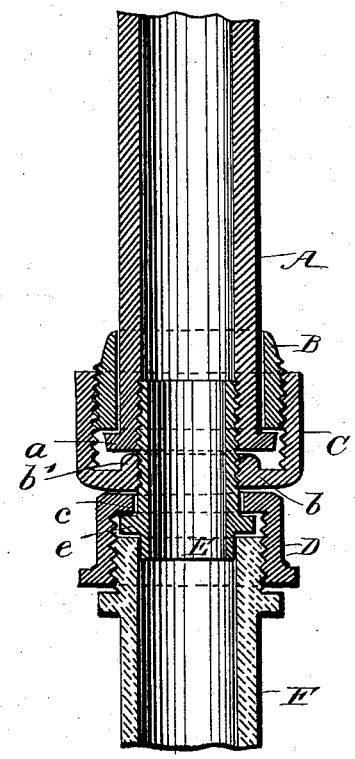
WITNESSES:
INVENTOR
A. H. Gindele
BY
ATTORNEYS.

UNITED STATES PATENT OFFICE.

ALBERT H. GINDELE, OF JERSEY CITY, NEW JERSEY.

GAS-METER CONNECTION.

SPECIFICATION forming part of Letters Patent No. 506,489, dated October 10, 1893.

Application filed July 17, 1893. Serial No. 480,748. (No model.)

*To all whom it may concern:*

Be it known that I, ALBERT H. GINDELE, of Jersey City, in the county of Hudson and State of New Jersey, have invented a new and useful Improvement in Gas-Meter Connections, of which the following is a full, clear, and exact description.

My invention relates to improvements in lead pipe attachments for meters, to connect such a gas registering device with a street service pipe and also with the riser of distributing gas pipes in a house.

The object of my invention is to provide a simple and inexpensive means for the attachment of the lead pipe for a meter connection, to the union nut which is to be screwed upon the hollow post of the gas meter.

To this end, my invention consists in the peculiar construction and combination of parts, as is hereinafter described and claimed.

Reference is to be had to the accompanying drawings forming a part of this specification, in which similar letters of reference indicate corresponding parts in both of the figures.

Figure 1 is a side view of the improvement in connection with a lead pipe portion and a meter post in part; and Fig. 2 is a longitudinal sectional view, on the line 2—2 in Fig. 1.

In the drawings, A represents the lead pipe at the end which is to be connected to a meter. There is an exteriorly threaded sleeve B, placed on the end of the pipe A, and the end of the pipe is then upset to produce an integral radial flange $a$ on it. The sleeve B, is true on the end near the flange $a$, and fits neatly upon the pipe.

A peculiarly formed junction nut C, is a novel feature of the invention, comprising a cylindrical shell formed of brass or other suitable metal, and provided with an inwardly radial flange $b$, that is threaded on its inner edge which is concentric with the inner surface of the cylindric shell, which surface is threaded to fit upon the threaded sleeve B. There is a hub-like projection $b'$ formed on the flange $b$, which projects toward the flange $a$, and is true on its face that is made to bear upon said flange when the nut is adjusted to effect such a contact of parts. The union nut D, is of the usual form, and is made to loosely encircle the thimble E, that is inserted through the central perforation of the inwardly radial flange $c$, which is a part of the union nut. The thimble E, has an externally radial flange $e$ formed on it near an end of the thimble that is intended to enter the top of the hollow meter post F. The flange $e$, has a gastight contact with the flange $c$ when the parts are assembled to securely attach the lead pipe A upon the meter post, the union nut being adapted to have a threaded engagement with the externally threaded end portion of the post as usual. The thimble E, is exteriorly threaded from a point near the radial flange $e$, to the end farthest from said flange, this part of the thimble being fitted to the threads in the flange $b$ of the nut C. A sufficient length is given to the thimble E, to permit its threaded end portion to be screwed into the bore of the lead pipe A, so as to produce a mating thread in the soft metal wall of said pipe which will add to the security of the joint and produce a perfectly gas-tight connection for each end of the lead pipe.

It is intended to use the improvement as a substitute for the solder joints usually produced between the thimble of a union nut and the end of the lead pipe, and also between a common nipple that is used to join the lead pipe connection to an iron pipe, which may be either the street service pipe or the riser of the distributing gas pipes for a house.

By using the improvement, a speedy and reliable connection may be produced between the gas meter and gas inlet and gas distributing pipes, dispensing with solder joints in the lead pipe connections.

Having thus fully described my invention, I claim as new and desire to secure by Letters Patent—

1. In a gas meter connection, the combination, with a lead pipe radially flanged at the end, and an externally threaded sleeve thereon, of a threaded thimble adapted to screw into the pipe, a junction nut threaded in two diameters and engaging the sleeve and thimble, and a union nut connecting the thimble with a meter post, substantially as described.

2. The combination with a lead pipe radially flanged at the end, and an externally threaded sleeve on the pipe, bearing upon the flange, of a junction nut internally threaded in two diameters, one thread engaging the sleeve, and an externally threaded thimble entering the end of the lead pipe, and receiving the other thread of the junction nut, and a union nut on the end of the thimble engaging a radial flange thereon and adapted to connect said thimble with a meter post, substantially as described.

ALBERT H. GINDELE.

Witnesses:
CHARLES W. PARKINS,
ALFRED D. HILLYER.